(12) United States Patent
Zeng

(10) Patent No.: US 11,702,170 B2
(45) Date of Patent: Jul. 18, 2023

(54) EXTREME LABOR-SAVING BICYCLE

(71) Applicant: Dongbin Zeng, Sichuan (CN)

(72) Inventor: Dongbin Zeng, Sichuan (CN)

(*) Notice: Subject to any disclaimer, the term of this patent is extended or adjusted under 35 U.S.C. 154(b) by 379 days.

(21) Appl. No.: 17/041,728

(22) PCT Filed: Feb. 27, 2019

(86) PCT No.: PCT/CN2019/076333
§ 371 (c)(1),
(2) Date: Sep. 25, 2020

(87) PCT Pub. No.: WO2019/184644
PCT Pub. Date: Oct. 3, 2019

(65) Prior Publication Data
US 2021/0114685 A1    Apr. 22, 2021

(30) Foreign Application Priority Data

Mar. 29, 2018  (CN) .......................... 201810272409.7

(51) Int. Cl.
| *B62M 1/20* | (2006.01) |
| *B62M 1/10* | (2010.01) |
| *B62M 1/12* | (2006.01) |
| *B62J 1/14*  | (2006.01) |
| *B62M 25/06* | (2006.01) |

(52) U.S. Cl.
CPC ................ *B62M 1/20* (2013.01); *B62M 1/10* (2013.01); *B62M 1/12* (2013.01); *B62J 1/14* (2013.01); *B62M 25/06* (2013.01)

(58) Field of Classification Search
CPC ............. B62M 3/02; B62M 1/12; B62M 1/20
See application file for complete search history.

(56) References Cited

U.S. PATENT DOCUMENTS

2021/0009228 A1* 1/2021 Yi ....................... A63B 22/0087
2021/0188392 A1* 6/2021 Zeng ........................ B62M 1/24

FOREIGN PATENT DOCUMENTS

| CN | 2103505 U | 5/1992 |
| CN | 2182139 Y | 11/1994 |
| CN | 2343065 Y | 10/1999 |
| CN | 1424228 A | 6/2003 |

(Continued)

OTHER PUBLICATIONS

International Search Report dated Apr. 30, 2019, issued in application No. PCT/CN2019/076333.

*Primary Examiner* — Kevin Hurley
(74) *Attorney, Agent, or Firm* — McClure, Qualey & Rodack, LLP

(57) ABSTRACT

Extreme labor-saving bicycle, comprising a front wheel assembly, a rear wheel assembly, a handle, a pedal, a frame, a connecting rod, a swinging rod, a seat and a transmission mechanism for transferring force of the swinging rod to the rear wheel assembly, wherein the front wheel assembly and the rear wheel assembly are mounted at front end and rear end of the frame, the pedal is rotatably mounted at lower end of the middle of the frame, the swinging rod and the pedal are hinged to two ends of the connecting rod, the seat is fixed at a hinging end of the connecting rod and the swinging rod, and one end of the swinging rod away from the seat, is hinged to front end of the frame and connected with the rear wheel assembly through the transmission mechanism.

6 Claims, 4 Drawing Sheets

(56) References Cited

FOREIGN PATENT DOCUMENTS

| | | | | |
|---|---|---|---|---|
| CN | 2709296 | Y | 7/2005 | |
| CN | 203937808 | U | 11/2014 | |
| CN | 107499442 | A * | 12/2017 | ................ B62J 1/08 |
| CN | 108454769 | A | 8/2018 | |
| KR | 200386602 | Y1 * | 6/2005 | ............. B62M 1/18 |
| KR | 101799847 | B1 * | 11/2017 | ............. B62K 13/08 |
| WO | 2012131404 | A1 | 10/2012 | |

* cited by examiner

EXTREME LABOR-SAVING BICYCLE

TECHNICAL FIELD

The present invention relates to bicycle, specifically, an extreme labor-saving bicycle.

BACKGROUND TECHNOLOGY

Transmission of conventional bicycles is done by oscillation movement ignited by human pedaling. As it is well known that there is a fatal dead center in the oscillation movement by human pedaling, which causes "no power transmitted while labor spent", and transmission efficiency is quite low near the dead center, resulting in a substantial waste of limited labor. As our society diversifies, a bicycle is not only a riding tool, it is also a body fitting tool and sports competition facility, or a travelling and entertaining article etc. People can only sit to drive the pedals to ride a bicycle, however, it is not healthy to sit for a long time, especially for waist and back, and a good body exercise effect is not achieved and subjects some human parts to undesired influence.

DISCLOSURE OF THE INVENTION

To address the above technical problems, the present invention provides an extreme labor-saving bicycle, to save riding labor with rider's own weight, and with the extreme labor-saving bicycle provided in the present invention, it is not necessary to ride the bicycle for a long time, and a good exercise effect can be achieved while every part of body is involved in the riding activity.

Technical design of the present invention to address the above problem is as following: an extreme labor-saving bicycle, comprises a front wheel assembly, a rear wheel assembly, a handle, a pedal, a frame, a connecting rod, a swinging rod, a seat and a transmission mechanism for transferring swinging force of the swinging rod to the rear wheel assembly, wherein, the front wheel assembly and the rear wheel assembly are mounted at the front end and the rear end of the frame, the pedal is rotatably mounted at the lower end of the middle of the frame, the swinging rod and the pedal are hinged to two ends of the connecting rod, the seat is fixed at a hinging end of the connecting rod and the swinging rod, and one end of the swinging rod, which is far away from the seat, is hinged to the front end of the frame and in transmission connected with the rear wheel assembly through the transmission mechanism.

Beneficial effects of the present invention are that: pedals, swinging rod and connection rod work together as a four-part connection rod system, in the meantime, pivoting on the connection point between the pedal and the frame, the pedals, swinging rod and seat forms a lever, and by moving the lever with the seat or pedals, the lever is moving, and when a person is riding, with feet on the pedals and sitting on the seat, a force has been exercised on the connection rod, which takes advantage of human weight, to save riding labor, and consequently, it is not necessary to ride with feet for a long time, and a good exercise can be achieved when riding with efforts of the entire body.

Based on the above technical design, the following improvements to the present invention are possible too.

Further, a support that is adjustable in height for limiting downward displacement of the swinging rod is disposed under the frame, and bottom of the support is fixed at lower side of the frame, and a cushioning shim is provided on top of the support under middle of the swinging rod.

Beneficial effects of the above technical improvement lies in limiting lowest position that the swinging rod can swing, and consequently, limit the four-part connection rod system, to keep the seat located within a reasonable height range and ease riding.

Further, one end of the pedal is hinged to the frame, and a rotation rod is extended from the hinged point to another end away from the pedal, and one end of the rotation rod that is away from the pedal is hinged with the connection rod, and an angle $\alpha$ is formed between the rotation rod and the pedal, and $179°\leq\alpha\leq180°$.

Beneficial effects of the above further design is to prevent dead center from happening and ease riding activity, Furthermore, a fan-shaped gear is disposed on the swinging rod, and one side of the fan-shaped gear is fixed onto the swinging rod near joint with the frame; virtual center of the fan-shaped gear falls on an end of the swinging rod; geared teeth are provided along the circumferential border of the fan-shaped gear; a first flywheel engaging with the fan-shaped gear is provided on the frame, and the first flywheel is kinetically connected with the rear wheel assembly by a transmission mechanism.

Beneficial effect of the above further technical improvement is that the transmission is steady and structure is not complex.

Still further, the transmission mechanism includes a second flywheel, a first chain, and a third flywheel, diameter of the second flywheel is bigger than that of the third flywheel, diameter of the second flywheel is bigger than that of the first flywheel, the second flywheel is coaxially connected with the first flywheel, the third flywheel is kinetically connected with the second flywheel by the first chain, and central axis of the third flywheel is connected to the rear wheel assembly.

Beneficial effect of the above further design is that, power transmission rate is improved and labor can be saved when diameter of the second flywheel is bigger than that of the first flywheel.

Still further, the transmission mechanism further comprises an intermediate flywheel; a rotation axle is vertically extended at joint where the pedal is rotatably connected to the frame, the intermediate flywheel is fixed on the said rotation axle, and the said second flywheel, the intermediate flywheel, and the third flywheel are kinetically connected via the first chain.

Beneficial effect of the above further technical plan is to increase supporting point of the first chain, to render it more reliable, and prevent chain falling off; in the meantime, it is possible to drive the first chain with the intermediate flywheel to complete power transmission when the first flywheel is rotating reversely.

Furthermore, the transmission mechanism comprises a second chain, a third chain, a fifth flywheel, a fourth flywheel, a transitional flywheel and an intermediate chain sprocket, a rotation axle is vertically extended at the joint where the pedal is rotatably connected to the frame, the transitional flywheel is sheathed on the rotation axle, the intermediate chain sprocket is configured to be coaxially connected onto circumferential wheel of the transitional flywheel; diameter of the fifth flywheel is bigger than that of the first flywheel; the fifth flywheel and the transitional flywheel are kinetically connected by the second chain, the intermediate chain sprocket is kinetically connected with the fourth flywheel by the third chain, the fourth flywheel is connected to the said rear wheel assembly, diameter of the fifth flywheel is bigger than that of the intermediate chain sprocket, diameter of the intermediate chain sprocket is bigger than that of the fourth flywheel, and diameter of the fourth flywheel is bigger than that of the transitional flywheel.

Beneficial effect of the above further technical plan is, two chains are performing power transmission rule by providing a transitional flywheel and an intermediate chain sprocket, which makes structure of the bicycle more reliable; power transmission rate is further improved, while riding is easier.

Still further, both connection rod and swinging rod is provided to be a retractable rod.

Beneficial effect of adopting the above technical modification is to make swinging range of the swinging rod, and seat height adjustable, suitable for person of different shapes.

Furthermore, the frame is configured to be triangular frame.

Beneficial effect of the above technical design is to promise overall steadiness of the bicycle, to make it secure and reliable.

1. Front wheel assembly; 2. Rear wheel assembly; 3. Handle; 4. Pedal; 5. Frame; 6. Connection rod; 7. Swinging rod; 8. Seat; 9. Support; 10. Cushioning shim; 11, rotation rod; 12. Fan-shaped gear; 13. First flywheel; 14. First chain; 15. Second flywheel; 16. Third flywheel; 17. Intermediate flywheel; 18. Second chain; 19. Third chain; 20. Transitional flywheel; 21. Intermediate chain sprocket; 22. Fourth flywheel; 23. Fifth flywheel; 23. Hand rest; 24. Second seat.

EMBODIMENTS

Hereafter principles and features of the present invention will be described in conjunction with the accompanying drawings and embodiments raised here is to illustrate the present invention, rather than limiting scope thereof.

Figure 1:
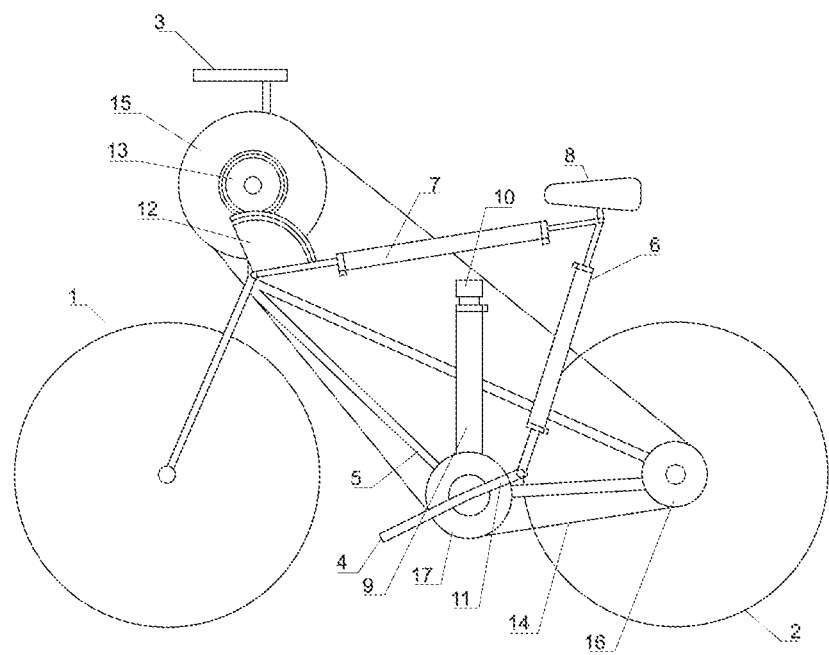
FIG. 1 is a structural schematic view of the present invention.

As is shown in FIG. 1, an extreme labor-saving bicycle, comprises a front wheel assembly 1, a rear wheel assembly 2, a handle 3, a pedal 4, a frame 5, a connection rod 6, a swinging rod 7, a seat 8 and a transmission mechanism for transmit swinging power of the swinging rod 7 to the rear wheel assembly 2, and both connection rod 6 and swinging rod 7 are retractable rod. The frame 5 is a triangular frame. The front wheel assembly 1 and the rear wheel assembly 2 are respectively provided on a front and rear end of the frame 5, the pedal 4 is rotatably installed at lower middle end of the frame 5, the swinging rod 7 and the pedal 4 are respectively provided on each end of the connection rod 6, the seat 8 is fixed at the hinging end between the connection rod 6 and the swinging rod 7, an end of the swinging rod 7 that is far away from the seat 8 is hinged to front end of the frame 5 and is kinetically communicated with the rear wheel assembly 2 by a transmission mechanism.

Specifically, both the front wheel assembly 1 and the rear wheel assembly 2 are of regular bicycle wheel structure, which comprises an axle, several spokes, a hub and a tire, while tire is fixed on the hub and the hub is fixed to the axle via spokes. Both connection rod 6 and swinging rod 7 comprises an inner pole and outer sleeve, one end of the inner pole is slidably connected to the outer sleeve, and fixed with screws, and it is possible to adjust length of the connection rod 6 and swinging rod 7 to match persons of different shapes.

Figure 6:
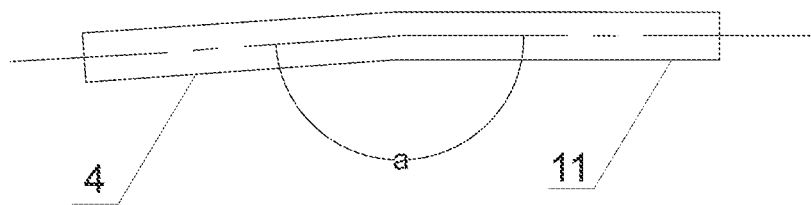
FIG. 6 is a structural schematic view of connection between pedal and rotation rod.

As is shown in FIG. 6, one end of the pedal 4 is hinged with the frame 5, and a rotation rod 11 is extended starting from the hinging end along a direction away from the pedal 4, one end of the rotation rod 11 that is far away from the pedal 4 is hinged with the connection rod 6, an angle α is formed between the rotation rod 11 and the pedal 4, and $179° \leq \alpha \leq 180°$.

A height adjustable support 9 is provided in a lower part of the frame 5 to limit the lowest position that the swinging rod can reach, and the support 9 comprises an inner pole and an outer sleeve too, one end of the inner pole is slidably connected in the outer sleeve and fixed with screws, bottom end of the support 9 is fixed in the lower part of the frame 5; a cushioning shim 10 is provided on top of the support 9, the cushioning shim 10 is provided under middle portion of the swinging rod 7, and the cushioning shim 10 is a U-shaped sponge, the swinging rod 7 can rest into the cushioning member 10, and when the riders are of different height and weight, it is possible to adjust height of the support 9, to limit a range that the swinging rod 7 can swing, to avoid damage to the swinging rod 7 when the swinging is overdue; as an end of the swinging rod 7 that is far away from the seat 8 is hinged to front end of the frame 5, the swinging rod is swinging pivoting on the front end of the frame 5, and can swing upwards and downwards, the support 9 is configured to limit a range that the swinging rod 7 can swing up and down, when the swinging rod 7 is swinging upwards, the swinging rod leaves the cushioning shim 10, and when the swinging rod 7 is swinging downwards, middle portion of the swinging rod 7 comes into contact with the cushioning shim 10, and the swinging rod goes into the cushioning shim 10, and a limit to the swinging rod 7 is formed by the support 9 and the cushioning shim 10 to prevent the swinging rod from going downwards any further. A fan-shaped gear 12 is configured on the swinging rod 7, angle of the fan-shaped gear 12 is 90-120°, one side of the fan-shaped gear 12 is fixed onto a side of the swinging rod 7 that is close to the frame 5, which renders virtual center of the fan-shaped gear 12 falls on an end of the swinging rod 7, geared teeth are provided on circumferential border of the fan-shaped gear 12, and when the swinging rod 7 is swinging pivoting on the front end of the frame 5, the fan-shaped gear rotates accordingly, and a first flywheel 13 engaging with the fan-shaped gear is provided on the frame 5, and the first flywheel 13 is kinetically communicated with the rear wheel assembly 3 via the transmission mechanism.

The transmission mechanism comprises a second flywheel 15, a first chain 14, and a third flywheel 16, wherein diameter of the second flywheel 15 is bigger than that of the third flywheel 16, and diameter of the second flywheel 15 is bigger than that of the first flywheel 13, the second flywheel 15 is coaxially connected with the first flywheel 13, the third flywheel 16 is connected to the second flywheel 15 via the first chain 14, and central axle of the third flywheel 16 is connected with the rear wheel assembly 2.

Flywheel mentioned in the present invention is among existing technology, and specific structure thereof will not be illustrated here, specifically the third flywheel in the Chinese application no. 201620691351.6 can be employed.

Embodiment 1

Figure 2:
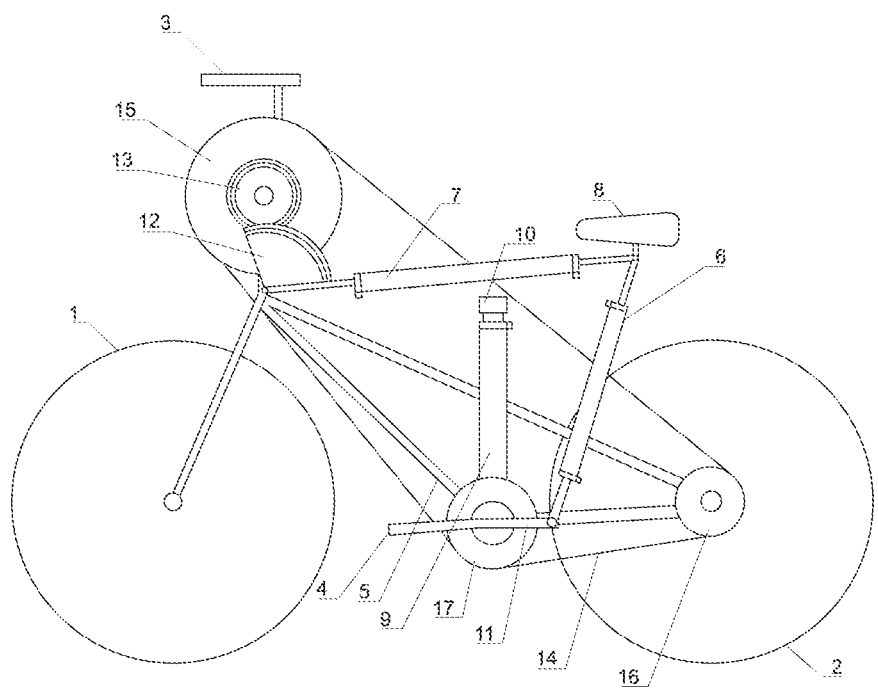
FIG. 2 is a structural schematic view of an embodiment 1 of the present invention.
Figure 3:
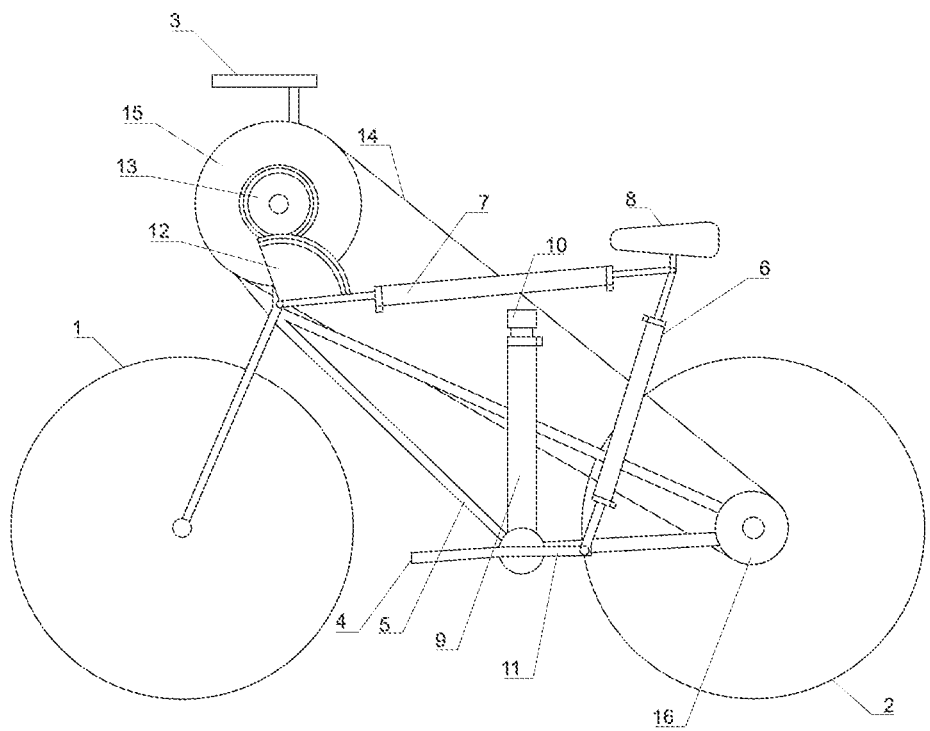
FIG. 3 is a structural schematic view of the embodiment 1 when the swinging rod is swung up.
Figure 4:
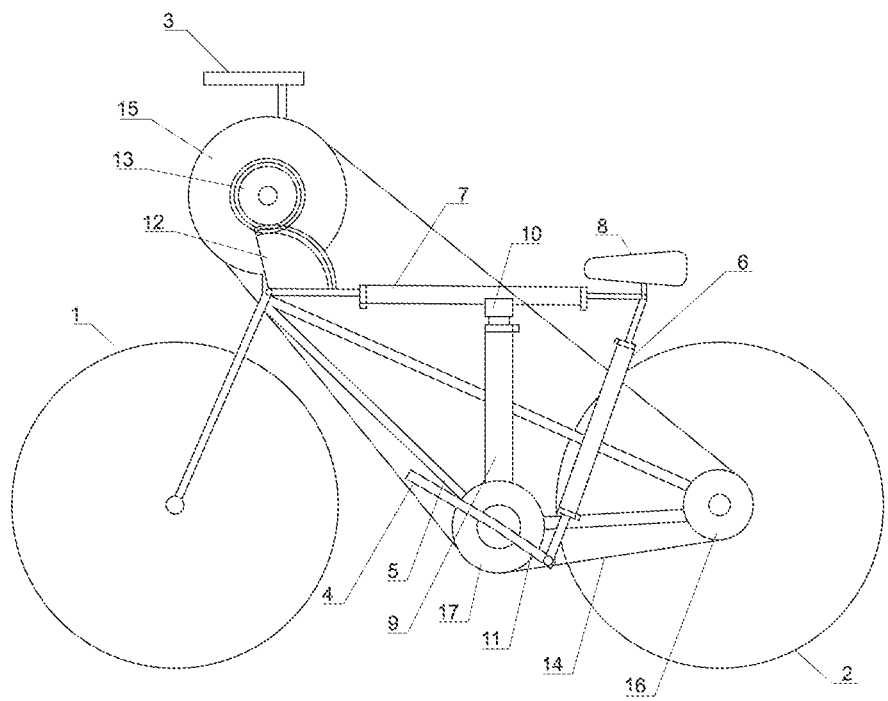
FIG. 4 is a structural schematic view of the embodiment 1 when the swinging rod is swung down.

As is shown in FIG. 2, the transmission mechanism comprises an intermediate flywheel 17, a rotation shaft is vertically extended at an end where the pedal 4 joins the frame 5, and the intermediate flywheel 17 is provided on the rotation shaft, the second flywheel 15, all of the intermediate flywheel 17 and the third flywheel 16 are kinetically connected by the first chain 14. As is shown in FIG. 3 and FIG. 4, during riding, the rider seats on the seat 8, with each foot on the pedal 4, the seat 8 supports overall weight of the rider at the buttock, the seat 8 moves downwards when pressed against, and one end of the swinging rod 7 is consequently moved down towards the seat 8, and the connection rod 6 moves downwards too, which drives the pedal 4 rotating upwards; one end of the swinging rod 7 near the front wheel assembly 1 makes a clockwise rotation pivoting on front end of the frame 5, consequently, the fan-shaped gear 12 rotate clockwisely pivoting on the front end of the frame 5, therefore, the first flywheel 13 rotates counterclockwise, the second flywheel 15 rotate counterclockwise, the first chain 14 rotates, the third flywheel 16 drives the rear wheel assembly 2 rotates counterclockwisely, and the bicycle goes forward; in the meantime, the rotation shaft and the intermediate flywheel 17 is not rotating, the intermediate flywheel is driven only by the first chain 14. Furthermore, pedal the pedal 4 with feet, and move the buttock upwards, and as the rider is not sitting on the seat 8, the rider's weight is exercising a downward force on the pedal 4, and moves the connection rod 6 upwards, one end of the swinging rod 7 near the seat swings upwards, another end of the swinging rod 7 near the front wheel assembly 1 rotates counterclockwisely pivoting on the front end of the frame 5, so does the fan-shaped gear 12, the first flywheel 13 rotates clockwise, and as a result of the ratchet design, the second flywheel 15 will not move, in the meantime, the rotation shaft drives the intermediate flywheel 17 makes a counterclockwise movement, the intermediate flywheel 17 drives the first chain 14, and consequently the third flywheel 16 and the rear wheel assembly 2 makes a counterclockwise rotation, the bicycle moves forwards, which resembles movement of common bicycles and will not be illustrated on specific details. The above process is repeated and riding can be done. Furthermore, due to lever effect formed among the pedal 4, the connection rod 6 and the seat 8, downward force exercised on the pedal 4 will multiply in the seat 8, and makes it easy to swing the swinging rod 7 downwards.

Embodiment 2

Figure 5:
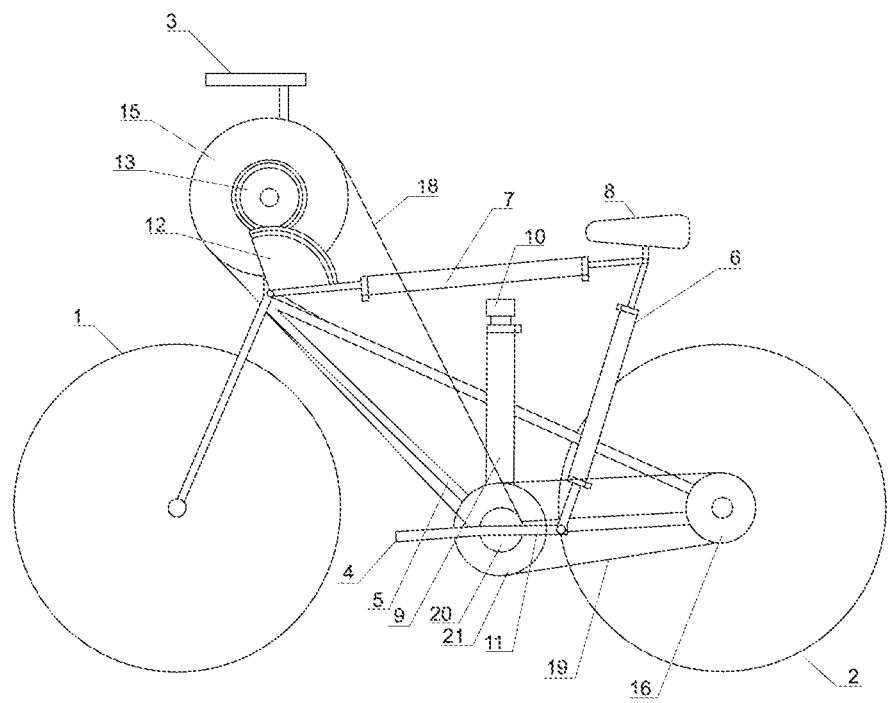
FIG. 5 is a structural schematic view of an embodiment 2 of the present invention.

As is shown in FIG. 5, difference between the present embodiment and the embodiment 1 lies in that, the transmission mechanism comprises a second chain 18, a third chain 19, a fifth flywheel 23, a fourth flywheel 22, a transitional flywheel 20 and an intermediate chain sprocket 21; a rotation shaft is vertically extended at a joint where the pedal 4 is rotatably connected to the frame 5, the transitional flywheel 20 is sleeved on the rotation shaft, the intermediate chain sprocket 21 is coaxially provided on a circumferential border of the transitional flywheel 20, the fifth flywheel 23 is connected coaxially to the first flywheel 13, diameter of the fifth flywheel 23 is bigger than that of the first flywheel 13, the fifth flywheel 23 is kinetically connected with the transitional flywheel 20 by the second chain 18, the intermediate chain sprocket 21 is connected kinetically with the fourth flywheel 22 by the third chain 19, and the fourth flywheel 22 is connected to the rear wheel assembly 2. Diameter of the fifth flywheel 23 is bigger than that of the intermediate chain sprocket 21, diameter of the intermediate chain sprocket 21 is bigger than that of the fourth flywheel 22, and diameter of the fourth flywheel 22 is bigger than that of the transitional flywheel 20.

Specifically, the transitional flywheel 20 comprises a ratchet disc and an outer disc provided with pawls, the ratchet disc and outer disc rotate or stop relatively with the pawls, the intermediate chain sprocket 21 and the transitional flywheel 20 are coaxially provided and the intermediate chain sprocket 21 is connected to the outer disc of the transitional flywheel 20. With this design, when the pedal rotates clockwise, and the fifth flywheel 23 rotates counterclockwise, the rotation shaft drives the ratchet disc rotate clockwise, and the ratchet disc will transmit no power to the outer disc, and in the meantime, the outer disc is driven by the second chain 18 to rotate counterclockwise, and consequently moves the intermediate chain sprocket 21 counterclockwise, to promise a forward movement of the rear wheel assembly 2.

During riding, the rider sits on the seat 8, with each foot on the pedal 4, the seat 8 supports the rider at the buttock, and moves downwards when pressed against, consequently, one end of the swinging rod 7 near the seat 8 moves downwards, the pedal 4 leans upwards, subsequently, one end of the swinging rod 7 near the front wheel assembly 1 rotates clockwise pivoting on a front end of the frame 5, so does the fan-shaped gear 12, and the first flywheel 13 is driven rotating counterclockwise, the fifth flywheel 23 rotates, the second chain 18 rotates, the transitional flywheel 20 rotates, which moves the intermediate chain sprocket 21, the third chain 19 rotates, and the rear wheel assembly rotates counterclockwise, the bicycle moves forward; in the meantime, the rotation shaft and intermediate flywheel 17 is not moving, and the intermediate flywheel 17 is only kinetically communicated with the second chain 18. Furthermore, pedal the pedal 4 downwards with the buttock raised up, overall weight of the rider exercises a downward force on the pedal 4, which moves the connection rod 6 upwards, one end of the swinging rod 7 near the seat 8 upwards, and another end of the swinging rod 7 near the front wheel assembly 1 rotates counterclockwise pivoting on the front end of the frame 5, so does the fan-shaped gear 12, the first flywheel 13 rotates clockwise, and the fifth flywheel 23 is not moving, in the meantime, the rotation shaft drives the transitional flywheel 20 move counterclockwise, which in turn moves the intermediate chain sprocket 21, and consequently, the fourth flywheel 22 and the rear wheel assembly 2 move counterclockwise at the effect of the third chain 19, and the bicycle moves forward. The above process is repeated until riding completion. Furthermore, due to a lever effect formed among the pedal 4, the connection rod 6, and the seat 8, a downward force exercised on the pedal 4 will multiply when transmitted to the seat 8, which saves labor in driving the swinging rod 7 swinging.

Embodiment 3

Figure 7:
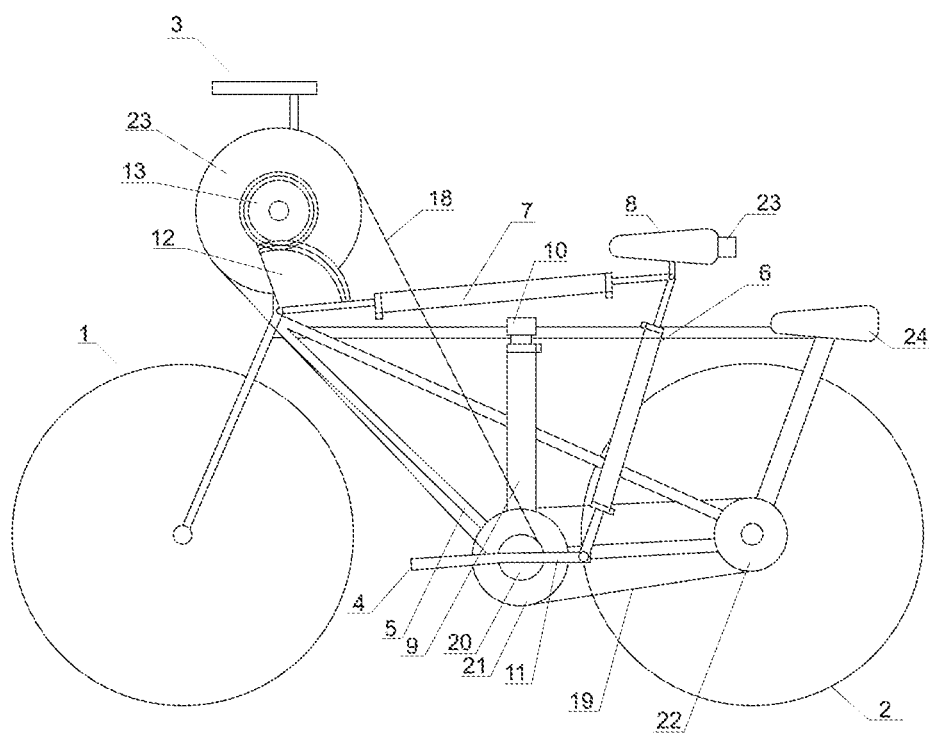
FIG. 7 is a structural schematic view of an embodiment 3 of the present invention.

As is shown in FIG. 7, difference between the present embodiment and the embodiment 1 lies in that, a second seat 24 is provided on the rear wheel assembly 2, the second seat 24 is fixed on the frame 5, and a hand rest 23 is provided at a rear side of the seat 8. During riding, both the second seat 24 and the seat 8 can be used for sitting a rider. During riding, rider on the second seat 24 holds the hand rest 23, and can help riding by pushing the hand rest 23 upwards or downwards.

Specifically, the hand rest 23 comprises a holding part and two connection parts vertically provided to both ends of the holding part and fixed on the seat 8.

The above description shows only preferred embodiments of the present invention, and is not designed to limit scope of the present invention, any modifications, equivalent replacements and improvement to the present invention falling within spirit and principles of the present invention are contained in the protection of the present invention.

The invention claimed is:

1. An extreme labor-saving bicycle, comprises
a front wheel assembly (1), a rear wheel assembly (2), a handle (3), a pedal (4), a frame (5), a connection rod (6), a swinging rod (7), a seat (8), and a transmission mechanism for transmitting swinging force of the swinging rod (7) to the rear wheel assembly (2), wherein:
the front wheel assembly (1) and the rear wheel assembly (2) are respectively provided on a front end and a rear end of the frame (5);
the pedal (4) is rotatably mounted on a lower side of middle portion of the frame (5);
the swinging rod (7) and the pedal (4) are respectively hinged to each end of the connection rod (6);
the seat (8) is provided at a joint where the connection rod (6) and the swinging rod (7) join together;
one end of the swinging rod (7) far away from the seat (8) is hinged to a front end of the frame (5) and kinetically communicated with the rear wheel assembly (2) by the transmission mechanism;
one end of the pedal (4) is hinged to the frame (5), and a rotation rod (11) is extended from the hinging point along a direction away from the pedal (4), one end of the rotation rod (11) that is far away from the pedal (4) is connected with the connection rod (6), an angle a is formed between the rotation rod (11) and the pedal (4), and $179° \leq \alpha \leq 180°$.

2. An extreme labor-saving bicycle according to the claim 1, characterized in that: a fan-shaped gear (12) is provided on the swinging rod (7), one side of the fan-shaped gear (12) is connected to a side of the swinging rod (7) close to the frame (5), virtual center of the fan-shaped gear (12) coincides with end of the swinging rod (7); geared teeth are provided along a circumferential border of the fan-shaped gear (12); a first flywheel (13) engaging with the fan-shaped gear (12) is provided on the frame (5), and the first flywheel (13) is kinetically communicated with the rear wheel assembly (2) via the transmission mechanism.

3. An extreme labor-saving bicycle according to claim 2, characterized in that: the transmission mechanism includes a second flywheel (15), a first chain (14), and a third flywheel (16), diameter of the second flywheel (15) is bigger than that of the third flywheel (16), diameter of the second flywheel (15) is bigger than that of the first flywheel (13); the second flywheel (15) and the first flywheel (13) are coaxially connected, the third flywheel (16) is kinetically communicated with the second flywheel (15) by a first chain (14) and central axle of the third flywheel (16) is connected to the rear wheel assembly (2).

4. An extreme labor-saving bicycle according to claim 3, characterized in that: the transmission mechanism further comprises an intermediate flywheel (17), a rotation shaft is vertically extended at the joint between the pedal (4) and the frame (5), the intermediate flywheel (17) is sleeved on the rotation shaft, the second flywheel (15), all of the intermediate flywheel (17) and the third flywheel (16) are kinetically communicated by the first chain (14).

5. An extreme labor-saving bicycle according to claim 2, characterized in that: the transmission mechanism comprises a second chain (18), a third chain (19), a fifth flywheel (23), a fourth flywheel (22), a transitional flywheel (20) and an intermediate chain sprocket (21), the fifth flywheel (23) is coaxially connected with the first flywheel (13), a rotation shaft is vertically extended at a joint between the pedal (4) and the frame (5), the transitional flywheel (20) is sleeved on the rotation shaft, the intermediate chain sprocket (21) is coaxially provided with the transitional flywheel (20), and the intermediated chain sprocket (21) is provided on an outer disc of the transitional flywheel (20); diameter of the fifth flywheel (23) is bigger than that of the first flywheel (13), the fifth flywheel (23) is kinetically communicated with the transitional flywheel (20) via the second chain (18), the intermediate chain sprocket (21) is kinetically communicated with the fourth flywheel (22) via the third chain (19), the fourth flywheel (22) is connected with the rear wheel assembly (2); diameter of the fifth flywheel (23) is bigger than that of the intermediate chain sprocket (21), diameter of the intermediate chain sprocket (21) is bigger than that of the fourth flywheel (22), diameter of the fourth flywheel (22) is bigger than that of the transitional flywheel (20).

6. An extreme labor-saving bicycle according to claim 1, characterized in that, both the swinging rod (7) and the connection rod (6) are telescopic rods.

* * * * *